United States Patent [19]

Pennaz

[11] Patent Number: 5,454,956

[45] Date of Patent: * Oct. 3, 1995

[54] METHOD OF CLEANING WASTE WATER AND RECOVERY OF CONTAMINANTS THEREFROM

[75] Inventor: Thomas J. Pennaz, Brooklyn Park, Minn.

[73] Assignee: Deluxe Corporation, Shoreview, Minn.

[*] Notice: The portion of the term of this patent subsequent to Aug. 16, 2011 has been disclaimed.

[21] Appl. No.: 41,789

[22] Filed: Apr. 1, 1993

Related U.S. Application Data

[63] Continuation-in-part of Ser. No. 946,762, Sep. 17, 1993, abandoned.

[51] Int. Cl.$^6$ ............................................. B01D 12/00
[52] U.S. Cl. ............................................. 210/708; 210/743
[58] Field of Search ......................... 210/667, 694, 210/705, 703, 708, 639, 743, 754; 8/111

[56] References Cited

U.S. PATENT DOCUMENTS

| | | |
|---|---|---|
| 2,621,130 | 5/1947 | Cutler . |
| 2,720,461 | 10/1955 | Voet . |
| 3,289,577 | 12/1966 | Uhlig . |
| 3,434,987 | 3/1969 | Dhein et al. . |
| 3,471,415 | 10/1969 | Friedman et al. . |
| 3,533,811 | 10/1970 | Clements et al. . |
| 3,650,667 | 3/1972 | Luechauer ............ 8/111 |
| 3,660,329 | 5/1972 | Wysocki . |
| 3,776,865 | 12/1973 | Glaser et al. . |
| 3,844,994 | 10/1974 | Viojayendran . |
| 3,847,850 | 11/1974 | Rudolph . |
| 4,026,794 | 5/1977 | Mauceri . |
| 4,072,644 | 2/1978 | Hedrick . |
| 4,137,083 | 1/1979 | Hedrick . |
| 4,163,001 | 7/1979 | Carumpalos et al. . |
| 4,173,532 | 11/1979 | Keoteklian . |
| 4,183,833 | 1/1980 | Miyaguchi et al. . |
| 4,221,686 | 9/1980 | Sakiyama et al. . |
| 4,229,747 | 10/1980 | Hwang . |
| 4,256,619 | 3/1981 | Miyaguchi et al. . |
| 4,260,491 | 4/1981 | Cassidy et al. . |
| 4,330,450 | 5/1982 | Lipowski et al. . |
| 4,363,886 | 12/1982 | Lipowski et al. . |
| 4,385,149 | 5/1983 | Tsuchiya et al. . |
| 4,388,434 | 6/1983 | Swift et al. . |
| 4,392,917 | 7/1983 | Lipowski et al. . |
| 4,419,132 | 12/1983 | Moynihan . |
| 4,505,828 | 3/1985 | Lipowski et al. . |
| 4,508,868 | 4/1985 | Whyzmuzis et al. . |
| 4,528,036 | 7/1985 | Rudolphy . |
| 4,552,592 | 11/1985 | Rudolphy et al. . |
| 4,552,670 | 11/1985 | Lipowski et al. . |
| 4,554,019 | 11/1985 | Moynihan . |
| 4,556,427 | 12/1985 | Lewis . |
| 4,579,888 | 4/1986 | Kodama et al. . |
| 4,589,920 | 5/1986 | Kanada et al. . |
| 4,610,792 | 9/1986 | Van Gils et al. ............ 210/639 |
| 4,612,051 | 9/1986 | Miller, Jr. et al. . |
| 4,648,905 | 3/1987 | Peck et al. . |

(List continued on next page.)

OTHER PUBLICATIONS

The Printing Ink Manual, Fourth Edition (1988) edited by R. H. Leach and published by Van Nostrand Reinhold.

*Primary Examiner*—Frank Spear
*Attorney, Agent, or Firm*—Dorsey & Whitney

[57] ABSTRACT

A method of cleaning waste water and removing contaminants therefrom with respect to compositions exhibiting water solubility behavior which is pH dependent. The method includes the preliminary step of applying the composition at a pH at which the composition is water insoluble, then removing excess composition from application equipment with a wash solution having a pH at which the composition is water soluble or washable, changing the pH of the wash solution to a pH at which the composition is water insoluble to thereby precipitate the composition and removing the composition by filtration or other separation techniques. The invention also relates to a shop towel clean up method.

25 Claims, No Drawings

U.S. PATENT DOCUMENTS

| | | |
|---|---|---|
| 4,659,380 | 4/1987 | Winters et al. . |
| 4,664,710 | 5/1987 | Gleason et al. . |
| 4,699,660 | 10/1987 | Frank et al. . |
| 4,732,616 | 3/1988 | Kondo et al. . |
| 4,747,882 | 5/1988 | Schwartz et al. . |
| 4,764,215 | 8/1988 | Rudolph . |
| 4,765,243 | 8/1988 | Schiefer et al. . |
| 4,783,220 | 11/1988 | Gamble et al. . |
| 4,789,399 | 12/1988 | Williams et al. . |
| 4,810,747 | 3/1989 | Bornack, Jr. et al. . |
| 4,822,419 | 4/1989 | Pepoy et al. . |
| 4,853,421 | 8/1989 | Hayes . |
| 4,870,139 | 9/1989 | Kveglis et al. . |
| 4,886,553 | 12/1989 | Gillich . |
| 4,886,844 | 12/1989 | Hayes . |
| 4,891,070 | 1/1990 | Dilling et al. . |
| 4,904,303 | 2/1990 | Rudolphy et al. . |
| 4,938,801 | 7/1990 | Yoshioka et al. . |
| 4,942,111 | 7/1990 | Wade et al. . |
| 4,943,430 | 7/1990 | Hefford et al. . |
| 4,944,768 | 7/1990 | Ballielio . |
| 4,963,188 | 10/1990 | Parker . |
| 4,966,628 | 10/1990 | Amon et al. . |
| 4,982,661 | 1/1991 | Zweig . |
| 4,990,185 | 2/1991 | Krishnan . |
| 5,004,763 | 2/1991 | Imagawa . |
| 5,009,716 | 4/1991 | Gerson . |
| 5,015,711 | 5/1991 | Simonet et al. . |
| 5,021,538 | 6/1991 | Crews . |
| 5,026,755 | 6/1991 | Kveglis et al. . |
| 5,030,683 | 7/1991 | Nakamura . |
| 5,066,331 | 11/1991 | Hutter . |
| 5,074,915 | 12/1991 | Yoshioka et al. . |
| 5,077,348 | 12/1991 | Nakamura et al. . |
| 5,087,659 | 2/1992 | Fujisawa . |
| 5,098,478 | 3/1992 | Krishnan et al. . |
| 5,100,934 | 3/1992 | Glesias . |
| 5,101,010 | 3/1992 | Dickens et al. . |
| 5,102,856 | 4/1992 | Doll et al. . |
| 5,104,449 | 4/1992 | Pavlin . |
| 5,104,567 | 4/1992 | Staehr . |
| 5,106,416 | 4/1992 | Moffatt et al. . |
| 5,109,054 | 4/1992 | Smith . |
| 5,114,478 | 5/1992 | Auslander et al. . |
| 5,116,409 | 5/1992 | Moffatt . |
| 5,118,583 | 6/1992 | Kondo et al. . |
| 5,127,948 | 7/1992 | Shepherd . |
| 5,143,639 | 9/1992 | Krawack . |
| 5,156,686 | 10/1992 | Van Slyke . |
| 5,207,922 | 5/1993 | McFarlan et al. ...................... 210/708 |
| 5,234,577 | 8/1993 | Van Slyke . |
| 5,338,351 | 8/1994 | Pennaz ................................. 106/20 R |

5,454,956

METHOD OF CLEANING WASTE WATER AND RECOVERY OF CONTAMINANTS THEREFROM

This is a continuation-in-part of application Ser. No. 07/946,762, filed Sep. 17, 1993, now abandoned.

BACKGROUND OF THE INVENTION

1. Field of the Invention

The present invention relates generally to the field of waste water treatment and more particularly to a method of cleaning waste water containing contaminants and the recovery of such contaminants therefrom. The present invention is applicable to a broad range of contaminants, but has particular application to the clean up of waste water from coating processes, and in particular, oil based coating processes such as lithographic or other printing processes, paint or varnish application processes or the like in which the oil based coating composition is water insoluble at first pH levels and water soluble or washable at second pH levels.

2. Summary of the Prior Art

Water treatment in general has grown significantly over the past several years. Treatment methods which result in clean water with minimal chemical or energy input are highly desirable. This is particularly true with industrial waste water effluents containing contaminants resulting from the clean up of various coating processes including lithographic or other ink printing processes and paint or varnish application processes. Waste water effluents from such processes often contain organic wash solvents which are needed to clean up application or processing equipment and tools. The laundering of shop towels and other cleaning aids containing such contaminants and organic wash solvents are also a source of pollution since the laundering medium containing such contaminants is commonly disposed of into the sewer system.

In a lithographic printing process which utilizes both an oil based ink composition and an aqueous fountain solution, printing plates and/or inks need to be periodically changed as one job is completed and another started. Whenever this occurs, the blanket cylinder and/or the entire print train including the application rollers, the print plate, etc. must be cleaned. Such cleaning is commonly accomplished using organic or other non aqueous wash solvents which dissolve the oil based ink for removal. This creates a waste solution comprised of the organic or other non aqueous wash solvent and the dissolved oil based contaminant as well as shop towels saturated with such materials.

Such a clean up process gives rise to several sources of both air and water pollution. First, many of the wash solvents needed to acceptably clean the oil based inks or other coating materials contain various volatile organic compounds (VOCs) which are ultimately dispersed into the atmosphere. Secondly, the organic or other non aqueous wash solvents and the dissolved oil contaminants cannot be discharged into the sewer system without extensive and costly processing and separation of the contaminants. In fact, many are considered hazardous wastes whose disposal is tightly controlled. Thirdly, the laundering of shop towels or other clean up aids and materials results in laundry waste water containing finely dispersed particles of the wash solvents and oil based contaminant which are difficult to separate through common filtration. Although technology such as reverse osmosis, distillation or other membrane processes will, in theory, function to separate the finely dispersed wash solvent and contaminant particles from the laundry waste water, such processes are energy intensive and require substantial maintenance and upkeep. As a consequence, few industries are able to economically clean such waste water and most continue to discharge such untreated water to the sewer system. The Clean Water Act and various other state and federal legislation, however, will force those responsible for polluting discharges to treat the effluent and to remove the contaminants regardless of treatment costs. As an alternative, many printers have gone to disposable towels which create disposal problems of their own.

Accordingly, a need exists for a method of cleaning waste water and recovering the contaminants therefrom. More particularly, a need exists for a method of cleaning waste water from various coating processes such as lithographic and other printing processes, paint or varnish application processes and the like. A need also exists for a method of recovering such contaminants from the waste water and from laundering solutions used to clean shop towels and other clean up aids.

SUMMARY OF THE INVENTION

The present invention relates generally to a clean up process for a composition or contaminant and more particularly, to a method of cleaning waste water containing a coating composition and the recovery of such composition in a manner which overcomes many of the problems in the prior art. Although the method of the present invention has applicability to a variety of compositions, both oil based and non oil based, it has particular applicability to certain coating compositions which exhibit water solubility behavior which is dependent on the pH of the solution to which they are exposed. In other words, the present invention is applicable to compositions or contaminants which are generally water insoluble at first pH levels and water washable or water soluble at second pH levels. Examples of such compositions include those identified in applicant's co-pending application Ser. No. 07/946,762, filed Sep. 17, 1992, the entirety of which is incorporated herein by reference. However, the scope of the present invention is not intended to be limited to these particular compositions.

The method of the present invention is also applicable to the clean up and recovery of compositions which are comprised of components not generally water soluble at any pH level, but which are combined with one or more compatible solubility controlling components whose water solubility is pH dependent and which is present in a quantity sufficient to provide the entire composition with pH dependent water solubility or washability behavior. Preferably this solubility controlling component or all or a part of the composition is a water reducible resin or other composition which exhibits the desired pH dependent water solubility behavior.

A step which is preliminary to the clean up or recovery steps is the application of the coating composition to a substrate. This is accomplished using various application or processing equipment and tools (hereinafter sometimes referred to as "application equipment" or "application equipment and tools"). The application is at a pH falling within the first pH levels at which the composition is generally water insoluble.

Following such application, the application equipment and tools are cleaned using an aqueous solution having a pH falling within the second pH levels at which the composition is water soluble or washable. This results in the composition dissolving in, or being rendered washable by, the aqueous wash solution. The cleaning and removal of the composition from the application equipment and tools can be aided with the use of shop towels, brushes and other cleaning aids. Completion of the cleaning step results in a spent wash solution containing dissolved or finely dispersed particles of the composition and shop towels, brushes or other cleaning aids also containing the aqueous wash solution and dissolved or finely dispersed oil based composition.

Clean up of the spent wash containing dissolved or finely dispersed composition involves changing its pH to a pH falling within the first pH levels. Because the composition is generally water insoluble under these conditions, a solubility shift occurs. This causes the composition to become water insoluble. Once insoluble, the composition is no longer stable in the generally aqueous wash solution. As a result, the particles of such composition become hydrophobic or oleophillic, and begin to precipitate out and form larger particles of a filterable size as more and more of the contaminants contact each other and stick together. In addition, these particles have sufficient dimensional stability to facilitate separation by low cost separation technologies. Following this conversion of the oil based composition to particles of a filterable size, they are removed from the spent wash solution either by conventional filtration or by centrifugation or other separation techniques known in the art.

Removing and recovering the composition from the shop towels and other cleaning aids involves first washing the same in a wash solution having a pH falling within the second pH levels or a conventional or modified laundering medium to remove the composition. This resulting wash solution or laundering medium is then treated as described above by changing the pH to a level corresponding to or falling within the first pH levels. This causes the dissolved or finely dispersed composition particles to precipitate out of solution and combine to produce particles of an adequate size capable of removal using conventional filtration or other separation techniques.

Accordingly, it is an object of the present invention to provide a method of cleaning waste water containing certain compositions and recovering such compositions therefrom.

Another object of the present invention is to provide a method of cleaning waste water from a coating process in which the waste water comprises coating compositions such as lithographic or other ink compositions and paint or varnish compositions.

A further object of the present invention is to provide a clean up and recovery method for a coating composition such as an oil based coating composition which is water insoluble at first pH levels and water soluble or washable at second pH levels.

A still further object of the present invention is to provide a method of cleaning shop towels or other cleaning aids containing contaminants including the cleanup of the laundering or wash medium and the removal of the contaminants therefrom.

These and other objects of the present invention will become apparent with reference to the description of the preferred method described below.

DESCRIPTION OF THE PREFERRED METHOD

The present invention relates to a method of cleaning waste water containing certain compositions or contaminants and a method of recovering such contaminants therefrom. More specifically, the present invention relates to a method of cleaning waste water containing compositions which are generally water insoluble at first pH levels and water soluble or water washable at second pH levels. Accordingly, those compositions to which the present invention is applicable are those described in applicant's co-pending application Ser. No. 07/946,762, filed Sep. 17, 1992, the entirety of which is incorporated herein by reference, as well as various other oil based or non oil based compositions or components which, either themselves or because of their combination with other solubility controlling components, exhibit water solubility/insolubility behavior which is pH dependent.

It is contemplated that the method of the present invention is applicable to the clean up and/or recovery of any composition whose water solubility is pH dependent, but has particular applicability to oil based coating compositions and more specifically to oil based ink, paint or varnish compositions which exhibit such behavior. The description of the preferred method will be with reference to the clean up and/or recovery of oil based lithographic printing inks.

Oil based compositions which exhibit the above described pH dependent water solubility behavior are those in which their acid functionality is sufficient to result in such behavior. Preferably, the compositions which exhibit sufficient acid functionality and thus also exhibit the pH dependent water solubility are those which have an Acid Number greater than 25. The Acid Number (or AN) of a particular material is one accepted measure of acid functionality. Acid functionality in turn is a measure of the amount of "free acid", or the amount of acid groups available for reaction, in the material. The Acid Number is defined as the amount of potassium hydroxide (KOH) in milligrams (mg) which is required to neutralize one gram of the material being tested. Thus, the Acid Number is a measure of the "free acid" groups or ends which are not tied up or hindered by some other component in the system. Normally, Acid Numbers of conventional lithographic inks are minimized to reduce ionic behavior of the composition. This in turn increases the overall stability and water insolubility of the ink. For a particular composition or contaminant to exhibit the necessary water solubility/insolubility pH dependency, the Acid Number should preferably be above about 25, more preferably above about 30 and most preferably above about 40. Below these threshold levels, the composition tends to be water insoluble regardless of the pH.

The extent to which the composition is required to have a maximum Acid Number will depend upon the particular environment in which the method is practiced. In a lithographic printing environment, a maximum Acid Number is required because of the criticality of maintaining a stable separation between the oil and water components of a lithographic system. In contrast, for non lithographic ink compositions and for paints, varnishes and other coating compositions, no maximum Acid Number exists. In such cases, however, the Acid Number will, to some extent, dictate the efficiency with which the water solubility of the composition can be converted between a water soluble and a water insoluble form. In general, the greater the Acid Number, the more acid will be required to convert the composition to a water insoluble form.

In a lithographic printing environment, the oil based ink composition should exhibit acid functionality defined by an Acid Number preferably in the range of about 25–150, more preferably in the range of about 30–100 and most preferably in the range of about 40–60. Compositions with Acid Numbers below these ranges will tend to not exhibit the necessary pH dependent water solubility for practicing the present invention, while compositions with Acid Numbers above these ranges will tend to exhibit insufficient stability for lithographic printing. In all cases, the particular Acid Number which is preferred will depend on the particular composition being used.

The method of the present invention is applicable to compositions which themselves individually exhibit pH dependent water solubility/insolubility behavior as well as compositions which alone do not exhibit such behavior, but which when combined with certain solubility controlling components will exhibit at least limited water solubility or washability behavior as a function of pH.

It has been found that certain compositions when combined with a sufficient quantity of a compatible solubility controlling component such as a water reducible alkyd, polyester or other resin, or a blend of such compounds, will result in the entire combined composition exhibiting pH dependent water solubility behavior sufficient to practice the method of the present invention. Preferably, the composition with which the method of the present invention is applicable should include at least 5% by weight, or about 5–60% by weight, of a solubility controlling component which is water insoluble at certain first pH levels and water soluble or washable at certain second pH levels. More preferably, such solubility controlling component should be present in an amount of at least about 10% or about 10–40% by weight. It has been shown that certain water reducible alkyds (Cargill's short oil alkyds 74–7450, 74–7451; Cargill's long oil alkyd 74–7416; Cook Composites short oil alkyd 101210), certain water reducible polyesters (Cargill's polyester 72–7203), certain water reducible polyolefins (Cargill's modified polyolefin 73–7358), certain water reducible modified oils (Cargill's modified linseed oil 73–7319) and certain water reducible epoxy esters (Cook Composites styrenated epoxy ester 100453) exhibit the desired characteristics and are capable of providing the required pH dependent solubility to the system provided they are compatible with the other components of the oil based composition and are present in an amount sufficient to cause such other components to exhibit similar characteristics. All of the above water reducible resins except the 73–7319 and the 73–7358 are available in a solvent diluted form. For those resins in a solvent diluted form it is preferable that they be solvent stripped.

For the water reducible compositions or other solubility controlling components exhibiting water solubility which is pH dependent and for ink compositions or other coating compositions incorporating such compounds, water solubility or washability characteristics depend on the pH of the aqueous solution with which the material comes into contact. Preferably the first pH level at which the above mentioned solubility controlling components or the composition are water insoluble are acidic pH levels less than 7.0 and the second pH level at which the solubility controlling components are water soluble or washable are alkaline pH levels greater than 7.0. It is contemplated, however, that the method of the present invention will also work in an alkaline system in which the composition is generally water insoluble at certain alkaline pH conditions and water soluble or washable at certain acidic pH conditions.

The method steps involved in the present invention include the preliminary step of applying the oil based coating or ink composition to a substrate at an application pH corresponding to or falling within the first pH levels described above. This is followed by removing the coating or ink composition from at least a portion of the application equipment and tools using shop towels, brushes or other cleaning aids and an aqueous wash solution having a solution pH falling within the second pH levels. This results in a spent wash solution containing dissolved or finely dispersed particles of the oil based composition and soiled shop towels and other cleaning aids containing similar materials. Next, the pH of the spent wash solution or the resulting wash or laundering medium from the shop towels cleaning process is lowered to a precipitation pH corresponding to the first pH levels. This converts the composition to a water insoluble form and causes it to precipitate out and combine to form particles which are sufficiently large for separation. Such particles are then separated and recovered via filtration, centrifugation or other known separation techniques. The filtrate from the separation process is a clear aqueous liquid substantially free of any of the composition or other contaminants, while the filtered material is comprised substantially of the separated composition or other contaminants.

The preliminary application step is dependent upon the particular composition being used and the particular environment in which such composition is being applied. In a lithographic printing application in accordance with the preferred method, the oil based ink composition, together with an aqueous fountain solution, are applied to a lithographic printing plate via application rollers. The ink is then transferred either directly to an image receiving substrate or to an intermediate blanket cylinder which then subsequently transfers the ink to the receiving substrate. During this process, the entire print train including the application rollers, the print plate and the blanket is exposed to the oil based ink composition.

In other printing processes, either oil based or non oil based ink compositions may be applied to a printing plate or the like, without an accompanying fountain solution, and thereafter transferred to an ink receiving substrate. Oil based or non oil based paints, varnishes and other coating compositions may also be applied to substrates using conventional application equipment and tools. Application may be via roller means as in lithographic printing or via spray, brush or other application techniques known in the art.

Regardless of the particular application environment, the application equipment and tools must be cleaned. In the lithographic printing application, all or part of the print train including the application rollers, the print plate and the blanket must be thoroughly cleaned to accommodate a change in the printing plate and/or ink. This is accomplished by flushing or wiping the application equipment with, or otherwise exposing it to, an aqueous wash solution with a pH level corresponding to the second pH levels defined above. Such flushing or wiping should be continued until the entire ink train and/or the blanket are clean. In the preferred procedure, the aqueous wash solution is applied in a manner such that the wash solution is mixed with or milled into the oil based composition on the application equipment. In the lithographic printing application, the wash solution is applied to the front end rollers of the print train and then cycled for about 100 cycles. Such mixing can also be accomplished via brushing, wiping or other similar techniques. Preferably the surfaces of the application equipment are then wiped with a shop towel or the like to finally remove any remaining composition contaminant.

Because the aqueous wash solution is at a pH level corresponding to the second pH levels (i.e., above 8.5 for the preferred method), the oil-based ink composition on the application equipment and tools becomes water soluble or water washable, thus facilitating its removal from the application equipment or tool surfaces. This is done either by the flushing action or by wiping such surfaces with a shop towel, brush or the like, or by both. For the lithographic printing application, this removal step produces a resulting spent wash solution containing dissolved or finely dispersed particles of the composition and soiled shop towels, brushes or other cleaning aids containing similar materials.

The particular efficiency of the removal or cleaning step in the lithographic printing application will depend upon various factors including, among others, the pH of the aqueous wash solution, the temperature of the wash solution, the amount of wash solution used and whether or not surfactants or other additives are used. In the preferred system, an increase in the pH of the wash solution will result in an increase in the speed with which the oil based composition will be removed from the surfaces and a decrease in the volume of wash solution which must be utilized. Preferably, the pH of the wash solution should be greater than 8.5, or in the range of 8.5–14, and most preferably greater than about 10.5 or in the range of 10.5–13. Increase in temperature will also tend to increase the efficiency of the removal or cleaning step by speeding up the conversion of the ink composition to a water soluble form and thus removal from the equipment. However, it is contemplated that most of the removal or cleaning steps will be performed at or about ambient temperatures.

Various additives can also be used to alter, and in particular to improve, the efficiency of the removal or cleaning step. For example, the use of various surfactants, cosolvents and other additives common to the industry may be used as part of the wash solution. Selection of the appropriate surfactant will depend on the particular composition. Examples of surfactants which have been found to be useful with oil based lithographic ink compositions include a nonionic surfactant made by Mazer Chemical and sold under the trade name Mazawet 77, a nonionic surfactant made by Air Products and sold under the trade name Surfonyl 104 and a cationic surfactant made by PPG Industries and sold under the trade name M Quat. Various other nonionic, cationic and anionic surfactants may also be used.

While not necessary to the practice of the present invention, surfactants provide additional surface wetting and dispersion characteristics during the cleaning (or solubilization) step. Of equal importance is the fact that the surfactants do not interfere with, but in fact appear to aid, the water clean up (or insolubilization) step as described below. This appears to result from the ability of the surfactants to surround the growing particles as they are formed. This in turn enhances the filterability of the resulting mixture.

If desired, the removal step may also include preapplication to the equipment of a clean up composition which is compatible with the composition to be removed and whose water solubility is pH dependent. Initial application of clean up composition will react with the ink composition thereon and render the same more readily water soluble at certain pH levels. Such a clean up composition may include a solubility controlling component and can be applied directly or, because of viscosity or other reasons, can be combined with one or more diluents compatible therewith. Virtually any of the water reducible alkyds, polyesters or other resins can be used as the solubility controlling component for this purpose provided they are compatible with the composition to be cleaned and exhibit the desired pH dependent water solubility behavior. Diluents which include fatty acids (such as oleic and steric acids), vegetable oils (such as soya, caster and linseed oils) and mineral oils may be used to reduce the viscosity of the solubility controlling component provided they are compatible both with the composition to be cleaned and the solubility controlling component. Thus, a precoating or preapplication, together with a mixing or milling in, of a compatible solubility controlling component or a clean up composition containing the same will improve the efficiency of the removal by reducing the amount of wash solution needed and the removal time.

Following removal of the oil based ink composition from the application equipment and tools as provided above, the composition exists as a dissolved portion, or as finely dispersed particles, within the spent wash solution. A portion of the removed oil based composition is also contained within the shop towels or other cleaning aids either as dissolved portions or as finely dispersed particles within the spent wash solution.

For that portion of the oil based composition existing in a dissolved or finely dispersed form within the spent wash solution, recovery of the composition involves first changing the pH of such spent wash solution to a pH corresponding to the first pH levels and then removing or recovering the composition by filtration, centrifugation or various other separation techniques known in the art.

In the preferred system, lowering the pH of the spent wash solution causes such composition to become water insoluble. This in turn causes the composition to precipitate out, thereby facilitating its separation by filtration, centrifugation or the like. Even compositions which normally exist as liquids are separated as discrete particles to further enhance the separation efficiency. The conversion to a water insoluble form also results in the precipitated particles having an affinity for one another so that agglomeration of particles occurs. This further improves the ability to separate the precipitated particles of the ink composition from the spent aqueous wash solution.

Both the rate and extent to which the composition comes out of solution or combines to form particles large enough to filter is dependent upon the amount of acid (or free protons) in the wash solution and thus the pH level to which the spent wash solution is lowered. This in turn is determined by the amount and strength of the particular acid being used and the Acid Number of the particular composition. During the process of lowering the pH, acid is consumed as it reacts with the acid functional groups to render it nonionic. At a pH of 6, the acid is relatively dilute and the chance for neutralization is reduced since the available acid is not in great supply. Thus, at a pH of 6, the extent of precipitation is diminished and the time for precipitation to occur is longer. As much as several hours may be required for the precipitation to reach its maximum levels. In contrast, if the pH of the spent wash solution is lowered to a pH of 2, excess acid is available and the conversion occurs to a greater extent and very rapidly, on the order of a few seconds to several minutes. Preferably, for complete precipitation and separation of the composition particles from the aqueous solution to occur, a pH below 5 or in the range of about 4–5 is preferred. At pH levels above 5, insufficient acid exists to fully neutralize the material. This results in incomplete separation. At pH levels below 4, excess acid is present. This will not necessarily improve the overall separation, but will speed up the process. Thus, below a pH level of 4, economic analysis will determine whether increased speed justifies the excess acid for a given application.

It has been shown that various additives can improve the conversion of the ink composition from a water soluble or washable form to a water insoluble form, and thus its precipitation. For example, certain salts, specifically sodium chloride and potassium chloride, have been shown to have such an effect. It is believed that this is due to the equilibrium shifting effect of the excess ions which reduces the ionic effect of the acid groups and shifts the solubility of the material down. The presence of a salt will not appreciably impact the ultimate extent of separation, but will tend to speed up the process.

After the pH of the spent wash solution has been lowered and the composition precipitated, such precipitated particles can be removed through various separation techniques such as filtration, centrifugation and the like which are known in the art. Filtration will normally be the most efficient separation technique which can be improved with the use of various filter aids known in the art. If the density difference between the particles and the water is sufficiently large, separation via centrifugation is also a viable alternative. It may also be desirable, in certain cases, to preconcentrate the contaminants in the wash solution (prior to lowering the pH) via reverse osmosis or other processes known in the art.

With respect to shop towels which contain portions of the ink composition, either in a dissolved or finely dispersed form as part of the spent wash solution, the separation and recovery of such composition is similar to the separation and recovery of the composition from the spent wash solution. However, a first step with respect to shop towels or other cleaning aids requires the removal of such composition from the shop towels themselves. This can be accomplished by washing, soaking or rinsing the shop towels in a washing pH solution failing within the second pH levels. An alternate procedure is to launder the shop towels in a conventional or modified manner using conventional or modified laundering detergents or other compositions for the purpose of cleaning the composition from the towels. In both situations, the ink composition ends up as dissolved or finely dispersed particles in the wash or laundry solutions. Following this removal or cleaning procedure, the resulting spent wash or laundry solution is treated in a manner similar to that described above by changing the pit to a level corresponding to the first pH level. When this is done, the previously dissolved or finely dispersed ink composition will become insoluble. This in turn causes the composition to precipitate out and combine with one another to form into larger particles capable of separation by filtration or the like.

In a conventional or modified laundering process which normally includes the presence of surfactants and detergents, such materials actually improve the precipitation process. During the conversion of the composition from a water soluble to a water insoluble form, such surfactants and detergents surround the particles and maintain them as discrete particles. This promotes larger particles and easier separation.

Having described the details of the preferred method, the following examples will demonstrate the applicability of the method of the present invention to a wide range of compositions and to various mixtures and materials generated during a clean up process. Throughout the application, and in the examples, percentages are based upon weight unless otherwise indicated. Further, in all examples, the water reducible alkyd or other resin was first solvent stripped to remove petroleum or other solvents.

PROCEDURE OF EXAMPLES 1–6

Examples 1–6 below were conducted to show application of the method of the present invention to an oil based lithographic ink composition (hereinafter referred to as Deluxe Ink #H32) having the following composition:

| Rosin (Arizona Chemical SLYVAROS R) | 30.14% |
|---|---|
| Alkyd (Cargill 74-7451) AN 47-53 | 13.80% |
| Castor Oil (USP-United Catalyst) | 15.53% |
| Oleic Acid (EMERSOL 213 NF, Henkel Inc.) | 15.53% |
| Black Pigment (REGAL 400R, Cabot Inc.) | 25.00% |

The above ink composition is an oil based ink composition exhibiting water solubility/insolubility behavior as a function of pH. Specifically, such composition is water insoluble at acidic pH levels and preferably pH levels below about 7.0 and is generally water soluble or washable at alkaline pH levels and preferably pH levels above about 8.5. The alkyd is a commercially available, water reducible short oil alkyd which has been solvent stripped.

In each of Examples 1–6, an aqueous waste water or spent wash solution was simulated and produced by combining known quantities of the above ink composition in a known quantity of an alkaline wash solution containing NaOH at a pH of 12.7. This was mixed with an impeller for about five minutes to achieve complete dispersion A standard Buchner funnel was fitted to a one liter filter flask and the flask was attached to a vacuum. Standard Whatman #2 filter paper was added to the Buchner funnel. In examples 1–5, 54 g of Hyflo Super-Cel filter aid was added to the funnel to complete the filter apparatus. In example 6, 54 g of the filter aid was added to 1 liter of the mixture. Following pretreatment by addition of an acid as set forth in Examples 2–6, but without pretreatment as provided in Example 1, each of the samples was passed once through the filter apparatus described above, under vacuum, and the filtrate was collected for analysis. Pretreatment with acid included adding the acid over a period of about 30 seconds until the desired pH was reached. Analysis of oils, greases and fats in the filtrate after separation was conducted using USEPA Method 413.1. Color evaluation of filtrate was conducted using visual qualitative analysis. Theoretical ink concentration and separation were calculated.

EXAMPLE 1 (NO PRETREATMENT)

Waste water sample: 0.1066% ink in solution at pH of 12.7

Ink concentration: 1066 mg/l

Pretreatment: None

Filtrate analysis: No effective separation

Oils, greases, fats analysis: 633.7 mg/l

Color: Dense black $$\text{Theoretical separation:} \frac{.75(1066) - 633.7}{.75(1066)} = 20.7\%$$

EXAMPLE 2 (PRETREATMENT BY pH REDUCTION)

Waste water sample: 0.1066% ink in solution at pH 12.7

Ink concentration: 1066 mg/l

Pretreatments: Addition of concentrated HCl to pH 2

Filtrate analysis: Effective separation

Oil, greases, fats: 2.6 mg/l
Color: Clear $$\text{Theoretical separation: } \frac{.75(1066) - 2.6}{.75(1066)} = 99.6\%$$

EXAMPLE 3 (PRETREATMENT BY pH REDUCTION AND HIGH INK CONCENTRATION)

Waste water sample: 1.000% ink in solution at pH 12.7
Ink concentration: 10,000 mg/l
Pretreatment: Addition of concentrated HCl to pH 3.4
Filtrate analysis: Effective separation
Oils, greases, fats: 25.0 mg/l
Color: Clear $$\text{Theoretical separation: } \frac{.75(10,000) - 25}{.75(10,000)} = 99.6\%$$

EXAMPLE 4 (DROP pH TO 6.0)

Waste water sample: 1.000% ink in solution at pH 12.7
Ink concentration: 10,000 mg/l
Pretreatment: Addition of concentrated HCl to pH 6.0
Filtrate analysis: Partial separation
Oils, greases, fats: 863 mg/l
Color: Slightly pigmented $$\text{Theoretical separation: } \frac{.75(10,000) - 863}{.75(10,000)} = 88\%$$

EXAMPLE 5 (DROP pH TO 6.0 AND ADD 5% KCl)

Waste water sample: 1.000% ink in solution at pH 12.7
Pretreatment: Add concentrated HCl to bring pH to 6. Also add 5% KCl to speed separation.
Filtrate analysis: Partial separation
Oils, greases, fats: 506 mg/l
Color: Very slightly pigmented $$\text{Theoretical separation: } \frac{.75(10,000) - 506}{.75(10,000)} = 93\%$$

EXAMPLE 6 (PRETREATMENT BY pH REDUCTION AND PREADDITION OF FILTERAID)

Waste water sample: 1.000% ink in solution at pH 12.7
Ink concentration: 10,000 mg/l
Pretreatment: Addition of concentrated $H_2SO_4$ to pH 4.0
Filtrate analysis: Effective separation
Oils, greases, fats: 33 mg/l
Color: Clear $$\text{Theoretical separation: } \frac{.75(10,000) - 33}{.75(10,000)} = 99.5\%$$

Example 1 demonstrated no effective separation of the ink from the waste water by the filtration procedure. Because of the USEPA Method 413.1 procedure used, a prefiltering step was performed on all samples. During the prefilter step, a certain amount of pigment, with absorbed oil, is trapped and removed from the system. Thus, the 20.7% theoretical separation for example 1 is misleading because much of the contaminant was removed as part of this procedure, not as part of the initial separation. In reality, little, if any, of the oils, fats, and greases would be removed during the filtering step if USEPA Method 413.1 procedure is not performed. The result of Examples 2, 3 and 6 demonstrated effective separation and recovery, while Examples 4 and 5 demonstrated partial separation and recovery.

EXAMPLES 7–11

The procedure of Examples 7–11 was similar to that of Examples 1–6, but different ink and other coating compositions were tested. The details are as follows:

EXAMPLE 7

In Example 7, the Deluxe #H32 ink composition identified in Examples 1–6 was mixed in a 5:1 ratio (Deluxe #H32: Multigraphic PS-274) with conventional oil based lithographic ink identified as Multigraphic PS-274 made by AM Multigraphic. This lithographic ink did not exhibit water solubility/insolubility behavior as a function of pH.

Waste water sample: 1.010% ink in solution at pH 12.7
Ink concentration: 10100 mg/l
Pretreatment: Add concentrate HCl to pH 4.0
Filtrate analysis: Complete separation
Oils, greases, fats: 33mg/l
Color: Clear $$\text{Theoretical separation: } \frac{.75(10,000) - 33}{.75(10,000)} = 99.6\%$$

EXAMPLE 8

In Example 8, the composition used was a water-based latex enamel identified as a Glidden Ultra Hide low lustre enamel exhibiting water solubility behavior as a function of pH.

Waste water sample: Enamel paint at 1.038% in solution at pH 12.7
Paint concentration: 10380 mg/l
Pretreatment: Treat with concentrated HCl to pH 2.1
Filtrate analysis: Complete separation
Oils, greases, fats: 194 mg/l
Color: Clear
Note: Theoretical separation unknown due to no knowledge of paint formula.

EXAMPLE 9

Example 9 involved a Handschy water-based black flexo ink identified by the tradename Hanco #50688 exhibiting water solubility as a function of pH.
Waste water sample: 1.005% ink in solution at pH 12.7

Ink concentration: 10050 mg/l
Pretreatment: Treat with concentrated HCl to pH 2.1
Filtrate analysis: Complete separation
Oils, greases, fats: 37 mg/l
Color: Clear, slight blue tint
Note: Theoretical separation unknown due to no knowledge of ink formula

EXAMPLE 10

Example 10 involved tests conducted on the clear varnish of the Deluxe #H32 ink composition identified in Examples 1–6, with pigments deleted.

Waste water sample: 1.016% clear varnish in solution at pH 12.7

Varnish concentration: 10160 mg/l
Pretreatment: Treat with concentrated HCl to pH 2.05
Filtrate analysis: Complete separation
Oils, greases, fats: 52 mg/l
Color: Clear $$\text{Theoretical separation: } \frac{10160 - 52}{10160} = 99.58\%$$

EXAMPLE 11

In Example 11, a series of experiments was conducted to determine the behavior of all of the ink compositions identified in the Examples 1–19 of applicants co-pending application Ser. No. 07/946,762, filed Sep. 17, 1992. The specific formulations of such ink compositions are incorporated herein by reference. All such ink compositions exhibited water solubility/insolubility behavior as a function of pH. For all such compositions, 10,000 mg of the ink composition was combined with one liter of a NaOH solution adjusted to a pH of 12.7. Each sample was pretreated with concentrated hydrochloric acid to a pH of about 2.0. In all samples, a noticeable precipitation was observed upon addition of the acid. The resulting mixture was filtered in accordance with the procedure described in Examples 1–6. In all instances, the filtrate was determined by visual observation to be a clear liquid with no noticeable traces of the ink composition.

EXAMPLES 12–19

Lithographic ink (Deluxe #H32) was applied to the rollers of an A. B. Dick 375 offset lithographic press until a consistent film of 0.007 inch was measured using an ink film thickness gauge.

In Examples 12–18, 10 milliliters of a solution of a preapplication clean up composition comprised of 10% by weight of a solubility controlling component (SCC), 87% by weight of a diluent (either oleic acid or castor oil) and 3% by weight of surfactant was applied to the rollers and allowed to mill in to the ink train for 100 press revolutions. A washup tray was then fitted on the press and the press rollers started. An aqueous wash solution of water/sodium metasilicate adjusted to pH 12.5 was sprayed on the rotating rollers until all ink was removed. A stopwatch was used to time the entire operation from the time where the wash up blade was attached to the press.

The test of Example 19 involved the evaluation of press clean up without the above preapplication solution. In Example 19, the exact procedure above was followed except the aqueous solution at pH 12.5 replaced the preapplication solution.

| Ex # | SCC | Diluent | Surfactant | % SCC | Result | Time (min.) |
|------|---------|-------------|------------|-------|--------|-------------|
| 12 | 74-7416 | Oleic Acid | Mazawet 77 | 10 | Clean | 4:30 |
| 13 | 74-7495 | Oleic Acid | Mazawet 77 | 10 | Clean | 4:10 |
| 14 | 73-7358 | Oleic Acid | Mazawet 77 | 10 | Clean | 3:40 |
| 15 | 10-1210 | Oleic Acid | Mazawet 77 | 10 | Clean | 3:45 |
| 16 | 10-0453 | Oleic Acid | Mazawet 77 | 10 | Clean | 3:25 |
| 17 | 74-7451 | Oleic Acid | Mazawet 77 | 10 | Clean | 3:50 |
| 18 | 74-7451 | Castor Oil/ Oleic Acid | Mazawet 77 | 10 | Clean | 3:45 |
| 19 | — | — | — | — | Clean | 5:40 |

In the above examples, 74-7416 is a Cargill water reducible long oil alkyd (AN 53–58); 74-7495 is a Cargill water reducible chain stopped alkyd (AN 33–38); 73-7358 is a Cargill water reducible modified polyolefin (AN 25–30); 10-1210 is a Cook Composite water reducible short oil alkyd (AN 32); 10-0453 is a Cook Composite water reducible styrenate epoxy ester (AN 65) and 74-7451 is a Cargill water reducible short oil alkyd (AN 47–53).

The table above illustrates a reduction of cleaning times of about 20%–40% with the use of a preapplication clean up composition.

EXAMPLES 20

Shop towels soiled with Deluxe #H32 ink were placed in an alkaline water bath at room temperature. One liter of water was used and the soiled towels were agitated for five minutes. The dirty water was drained and the shop towels wrung out. One liter of tap water was introduced (at room temperature) and the towels were agitated for another five minutes. The rinse water was collected. An additional rinse cycle was used and the resulting towels were clean.

The collected water (including both the wash and rinse) was then lowered to a pH of 3.0 using hydrochloric acid and filtered though a Whatman #2 filter. Clear filtrate was obtained.

EXAMPLES 21

The procedure in Example 20 was followed except 10 gm of Surf laundry detergent was added per liter of wash water. Again clean towels resulted and the waste water was successfully treated.

Although the description of the preferred method have been quite specific, it is contemplated that various modifications could be made without deviating from the spirit of the present invention. Accordingly, it is intended that the scope of the present invention be dictated by the appended claims rather than by the description of the preferred method.

I claim:

1. A process for application and clean up of a coating composition having at least a portion which exhibits pH dependent water solubility behavior and is substantially water insoluble at first pH levels and water washable at second pH levels, said process comprising the steps of:

applying said composition to a substrate at an application pH falling within said first pH levels using application equipment;

removing said composition from at least a portion of said application equipment with an aqueous wash solution having a solution pH falling within said second pH levels to form a spent wash solution containing the composition component removed from the application equipment;

changing the pH of said spent wash solution to a precipitation pH falling within said first pH levels to cause precipitation of said composition component; and removing the precipitated composition component from said spent wash solution.

2. The process of claim 1 wherein said composition component is removed from said spent wash solution by filtration.

3. The process of claim 1 wherein said first pH levels are acidic and said second pH levels are alkaline.

4. The process of claim 3 wherein said precipitation pH is less than about 6 and said solution pH is greater than about 8.5.

5. The process of claim 1 including the step of applying clean up composition to said application equipment prior to removing said composition front said application equipment, wherein said clean up solution is water insoluble at said first pH levels and water washable at said second pH levels.

6. The process of claim 1 including the step of adding a salt to the spent wash solution to assist in precipitation of said composition component.

7. The process of claim 1 wherein said coating composition is an oil based coating composition.

8. The process of claim 7 wherein said coating composition is a lithographic ink composition.

9. A process for clean up of a composition in which at least a portion of said composition exhibits pH dependent water solubility behavior and is substantially water insoluble at first pH levels and water washable at second pH levels said process comprising the steps of:

combining said composition with an aqueous wash solution having a solution pH falling within said second pH levels to form a spent wash solution containing a composition component portion of said composition;

changing the pH of said spent wash solution to a precipitation pH falling within said first pH levels to cause precipitation of said composition component; and removing the precipitated composition component from said spent wash solution.

10. The process of claim 9 wherein said composition component is removed from said spent wash solution by filtration.

11. The process of claim 10 wherein said first pH levels are acidic and said second pH levels are alkaline.

12. The process of claim 11 wherein said precipitation pH is less than about 6 and said solution pH is greater than about 8.5.

13. The process of claim 9 including the step of adding a salt to the spent wash solution to assist in precipitation of said composition component.

14. The process of claim 9 wherein said composition is a coating composition.

15. The process of claim 14 wherein said coating composition comprises one of an ink composition, a paint composition or a varnish composition.

16. The process of claim 15 wherein said coating composition is an oil based composition.

17. The process of claim 16 wherein said coating composition is a lithographic ink composition.

18. A process for laundering clean up towels used in the clean up of, and containing a residue of, a composition having a portion which exhibits pH dependent water solubility behavior and is substantially water insoluble at first pH levels and water washable at second pH levels, said process comprising the steps of:

washing said towels in an aqueous wash solution at a washing pH falling within said second pH levels until said towels are substantially free of said composition residue and said composition residue is substantially in said wash solution to form a spent wash solution;

changing the pH of said spent wash solution to a precipitation pH falling within said first pH levels; and removing said composition residue from said spent wash solution.

19. The process of claim 18 wherein said wash solution is a laundering medium.

20. The process of claim 18 wherein said composition component is removed from said spent wash solution by filtration.

21. The process of claim 18 wherein said first pH levels are acidic and said second pH levels are alkaline.

22. The process of claim 21 wherein said wash pH is greater than about 8.5 and said precipitation pH is less than about 6.

23. The process of claim 18 wherein said composition is an oil based coating composition.

24. The process of claim 23 wherein said composition is a lithographic ink composition.

25. A process for application and clean up of a lithographic ink composition exhibiting pH dependent water solubility behavior, said ink composition being substantially water insoluble at first pH levels and water washable at second pH levels, said process comprising the steps of:

applying said composition to a substrate at an application pH falling within said first pH levels using application equipment;

removing said composition from at least a portion of said application equipment with an aqueous wash solution having a solution pH falling within said second pH levels to form a spent wash solution containing the composition component removed from the application equipment;

changing the pH of said spent wash solution to a pH falling within said first pH levels; and removing the composition component from said spent wash solution.

* * * * *